US010479399B2

(12) United States Patent
Beyerlein et al.

(10) Patent No.: US 10,479,399 B2
(45) Date of Patent: Nov. 19, 2019

(54) REDUNDANT GEAR ASSEMBLY FOR VEHICLE STEERING COLUMN AND METHOD

(71) Applicant: STEERING SOLUTIONS IP HOLDING CORPORATION, Saginaw, MI (US)

(72) Inventors: Jeffrey E. Beyerlein, Frankenmuth, MI (US); Jason T. Rutkiewicz, Freeland, MI (US); Niklaus A. von Matt, Midland, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 131 days.

(21) Appl. No.: 15/612,623

(22) Filed: Jun. 2, 2017

(65) Prior Publication Data

US 2018/0346014 A1 Dec. 6, 2018

(51) Int. Cl.
*B62D 5/04* (2006.01)
*F16H 1/16* (2006.01)
*B62D 5/00* (2006.01)
*B62D 15/02* (2006.01)

(52) U.S. Cl.
CPC ............ *B62D 5/0409* (2013.01); *B62D 5/003* (2013.01); *B62D 15/025* (2013.01); *F16H 1/16* (2013.01)

(58) Field of Classification Search
CPC ..... B62D 5/0409; B62D 5/0454; B62D 5/003
See application file for complete search history.

(56) References Cited

U.S. PATENT DOCUMENTS

| 4,858,490 A | 8/1989 | Grant | |
|---|---|---|---|
| 5,762,162 A * | 6/1998 | Bodtker | B62D 5/0409 180/444 |
| 6,655,709 B2 * | 12/2003 | Sherwin | B62D 1/163 280/402 |
| 6,776,252 B1 * | 8/2004 | Andonian | B62D 5/001 180/402 |
| 6,929,090 B2 * | 8/2005 | Furumi | B62D 5/04 180/444 |
| 7,322,439 B2 * | 1/2008 | Hara | B62D 1/163 180/402 |
| 7,552,795 B2 * | 6/2009 | Sugitani | B62D 5/003 180/402 |

(Continued)

FOREIGN PATENT DOCUMENTS

| CN | 105235738 A | 1/2016 |
|---|---|---|
| DE | 19902556 A1 | 7/2000 |

*Primary Examiner* — Kevin Hurley

(57) ABSTRACT

A redundant gear assembly for a vehicle steering column includes a gear operatively coupled to a steering column component. Also included is a first and second set of gear teeth on the gear. Yet further included is a first motor driving a first gear input component, the first gear input component in meshed engagement with the first set of gear teeth to provide a first steering assist torque that is representative of a desired steering assist torque in a primary operating mode of the redundant gear assembly. Also included is a second motor driving a second gear input component, the second gear input component in meshed engagement with the second set of gear teeth to provide a second steering assist torque in a redundant operating mode of the redundant gear assembly, the second motor not driving the second gear input component in the primary operating mode.

16 Claims, 6 Drawing Sheets

(56) References Cited

U.S. PATENT DOCUMENTS

| | | | |
|---|---|---|---|
| 7,628,245 B2* | 12/2009 | Osonoi | B62D 1/163 |
| | | | 180/403 |
| 7,798,279 B2* | 9/2010 | Williams | B62D 1/163 |
| | | | 180/402 |
| 8,690,173 B2* | 4/2014 | Bilmayer | B62D 3/126 |
| | | | 280/93.514 |
| 9,302,701 B2* | 4/2016 | Schneider | B62D 5/0481 |
| 2006/0042858 A1* | 3/2006 | Boyle | B62D 5/003 |
| | | | 180/402 |
| 2006/0278466 A1* | 12/2006 | Cheng | B62D 5/04 |
| | | | 180/444 |
| 2010/0072738 A1* | 3/2010 | Szabela | B62D 5/04 |
| | | | 280/771 |
| 2010/0288576 A1* | 11/2010 | Yamanaka | B62D 5/001 |
| | | | 180/443 |

* cited by examiner

REDUNDANT GEAR ASSEMBLY FOR VEHICLE STEERING COLUMN AND METHOD

BACKGROUND OF THE INVENTION

The following description relates to vehicle steering columns and, more particularly, to a redundant gear assembly for such steering columns.

Electrically actuated or electrically assisted steering systems provide power assist to a steering assembly. A controller receives an input signal and commands an electric motor to drive a gear arrangement to provide assistance to a user by lessening the input torque required to perform various steering functions. Many of the gear arrangements do not include redundancy. If a gear tooth breaks, the vehicle reverts to manual steering. As steering loads increase, manual steering may be too difficult for some drivers. Furthermore, manual control is not available in steer by wire applications, as there may not be a physical connection between the steering wheel and the road wheels. In an effort to increase safety, many automobile manufacturers are requesting redundancies in many vehicle applications, including steering systems.

SUMMARY OF THE INVENTION

According to one aspect of the invention, a redundant gear assembly for a vehicle steering column includes a gear operatively coupled to a steering column component. Also included is a first set of gear teeth on the gear. Further included is a second set of gear teeth on the gear. Yet further included is a first motor driving a first gear input component, the first gear input component in meshed engagement with the first set of gear teeth to provide a first steering assist torque that is representative of a desired steering assist torque in a primary operating mode of the redundant gear assembly. Also included is a second motor driving a second gear input component, the second gear input component in meshed engagement with the second set of gear teeth to provide a second steering assist torque in a redundant operating mode of the redundant gear assembly, the second motor not driving the second gear input component in the primary operating mode.

According to another aspect of the invention, a redundant gear assembly for a vehicle steering column includes a gear operatively coupled to a steering column component. Also included is a first set of gear teeth on the gear. Further included is a second set of gear teeth on the gear. Yet further included is a first motor driving a first gear input component, the first gear input component in meshed engagement with the first set of gear teeth to provide a first steering assist torque in a primary operating mode of the redundant gear assembly. Also included is a second motor driving a second gear input component, the second gear input component in meshed engagement with the second set of gear teeth to provide a second steering assist torque in the primary operating mode.

According to yet another aspect of the disclosure, a redundant gear assembly for a vehicle steering column includes a first gear operatively coupled to a steering column component. Also included is a second gear operatively coupled to the steering column component. Further included is a first set of gear teeth on the first gear. Yet further included is a second set of gear teeth on the second gear. Also included is a first motor driving a first gear input component, the first gear input component in meshed engagement with the first set of gear teeth to provide a first steering assist torque that is representative of a desired steering assist torque in a primary operating mode of the redundant gear assembly. Further included is a second motor driving a second gear input component, the second gear input component in meshed engagement with the second set of gear teeth to provide a second steering assist torque in a redundant operating mode of the redundant gear assembly, the second motor not driving the second gear input component in the primary operating mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a redundant gear assembly is provided for use in vehicle steering columns. The redundant gear assembly described herein may be employed with various types of steering columns. In particular, electric power steering systems, steer by wire systems, and autonomous or semi-autonomous driving systems are examples of vehicle steering columns that may benefit from the embodiments disclosed herein. The term autonomous or semi-autonomous refers to vehicles or vehicle sub-systems that are configured to perform operations without continuous input from a driver (e.g., steering, accelerating, braking etc.) and may be equipped with Advanced Driver Assist System (ADAS) to allow the vehicle to be autonomously controlled using sensing, steering, and/or braking technology.

Figure 1:
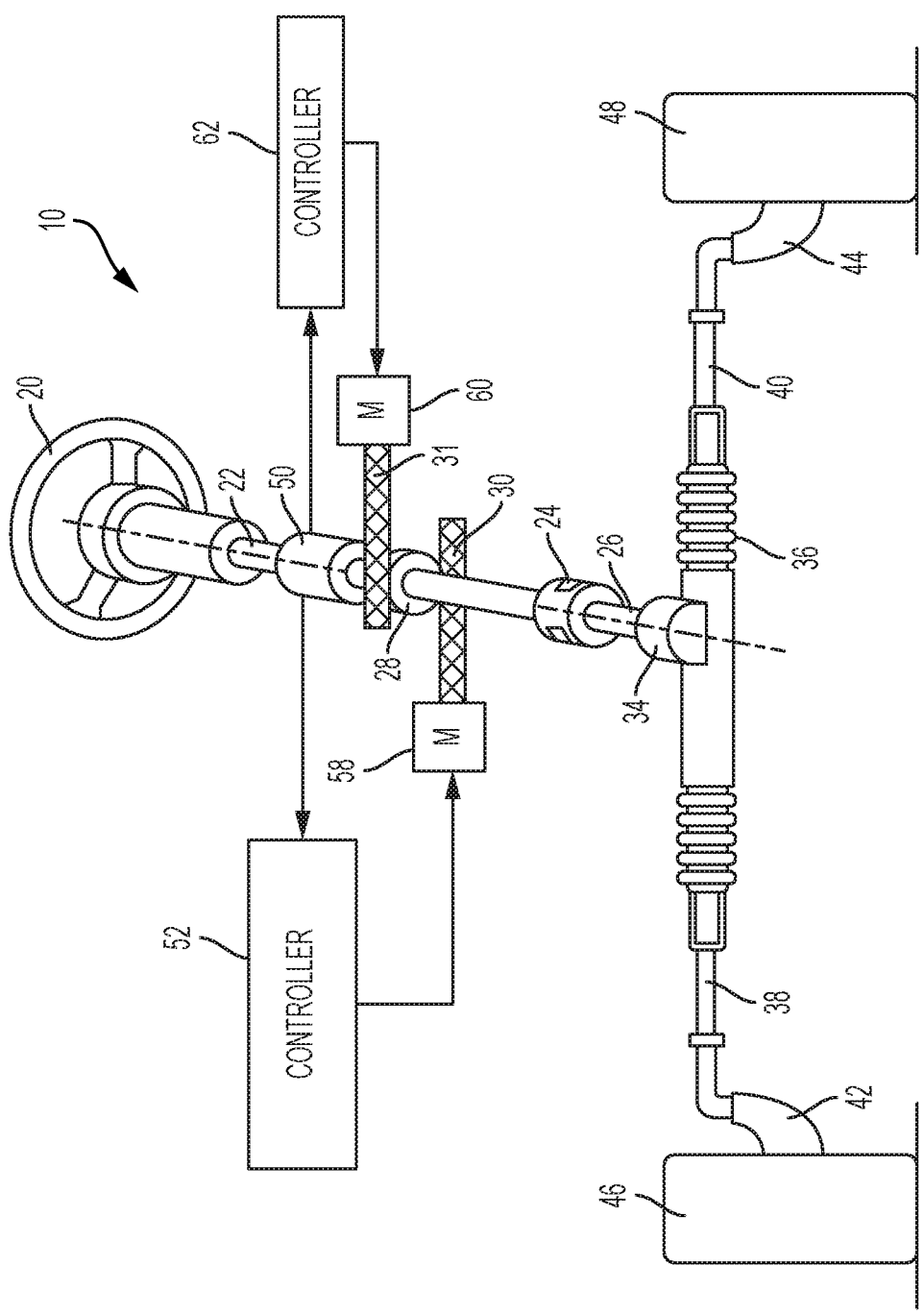
FIG. 1 is a perspective view of a steering system for a vehicle.

FIG. 1 illustrates a steering system 10 that is provided to steer a vehicle in a desired direction. The steering system 10 includes a handwheel 20, an upper steering column 22, a universal joint 24, a lower steering column 26, a gear 28, a first gear input component 30, a gear housing 34, a steering mechanism 36, tie rods 38, 40, steering knuckles 42, 44, and road wheels 46, 48. As will be appreciated from the disclosure, a second gear input component 31 and the gear 28 form a redundant gear arrangement.

In some embodiments, the steering system 10 is an electric power steering system that utilizes a rack and pinion steering mechanism 36, which includes a toothed rack (not shown) and a pinion gear (not shown) located under gear housing 34. During operation, as handwheel 20 is turned by a vehicle operator, upper steering column 22 is connected to lower steering column 26 and turns the pinion gear. Rotation of the pinion gear moves the toothed rack, which moves tie rods 38, 40. Tie rods 38, 40 in turn move respective steering knuckles 42, 44, which turn the respective road wheels 46, 48. It is to be appreciated that the steering system 10 may include fewer or more shaft or column components. Furthermore, as described above, in some embodiments a physical connection is not provided between the handwheel 20 (or other steering input device) and the lower steering column 26. Therefore, it is to be understood that the gear 28 that transmits the assist torque is operatively coupled to a steering column component and is not limited to connection to the portion of the column described above or in the manner illustrated.

The steering system 10 may include a control system to assist in controlling the steering system 10. In some embodiments, the control system 14 includes a column torque sensor 50, a controller 52, a first steering assist motor 58, and a second steering assist motor 60. The column torque sensor 50 generates a signal indicative of an amount of torque being applied to the vehicle handwheel 20 and the upper steering column 22 by a vehicle operator. In one embodiment, the torque sensor 50 includes a torsion bar (not shown) which outputs a variable-resistance to the controller 52 based on an amount of twist of the torsion bar. Alternatively, other types of torque sensors known to those skilled in the art could be utilized. The controller 52 generates control signals that control operations of the first steering assist motor 58. The second steering assist motor 60 may receive signals from the controller 52 or from a separate, independent controller, such as controller 62. The controller(s) is electrically coupled to the torque sensor 50. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

The first motor 58 is configured to drive the first gear input component 30, which is operably coupled to the gear 28 for moving lower steering column 26, steering mechanism 36, tie rods 38, 40, and knuckles 42, 44 toward an operational position wherein road wheels 46, 48 have a desired front road wheel angle. The second motor 60 is configured to drive the second gear input component 31, which is operably coupled to the gear 28 for moving lower steering column 26, steering mechanism 36, tie rods 38, 40, and knuckles 42, 44 toward an operational position wherein road wheels 46, 48 have a desired front road wheel angle. The dual gear arrangement provides a redundant gear assembly to ensure that steering assist is maintained even in the event of failure of one of the gear arrangements, or connections, as will be appreciated from the embodiments described herein.

Figure 6:
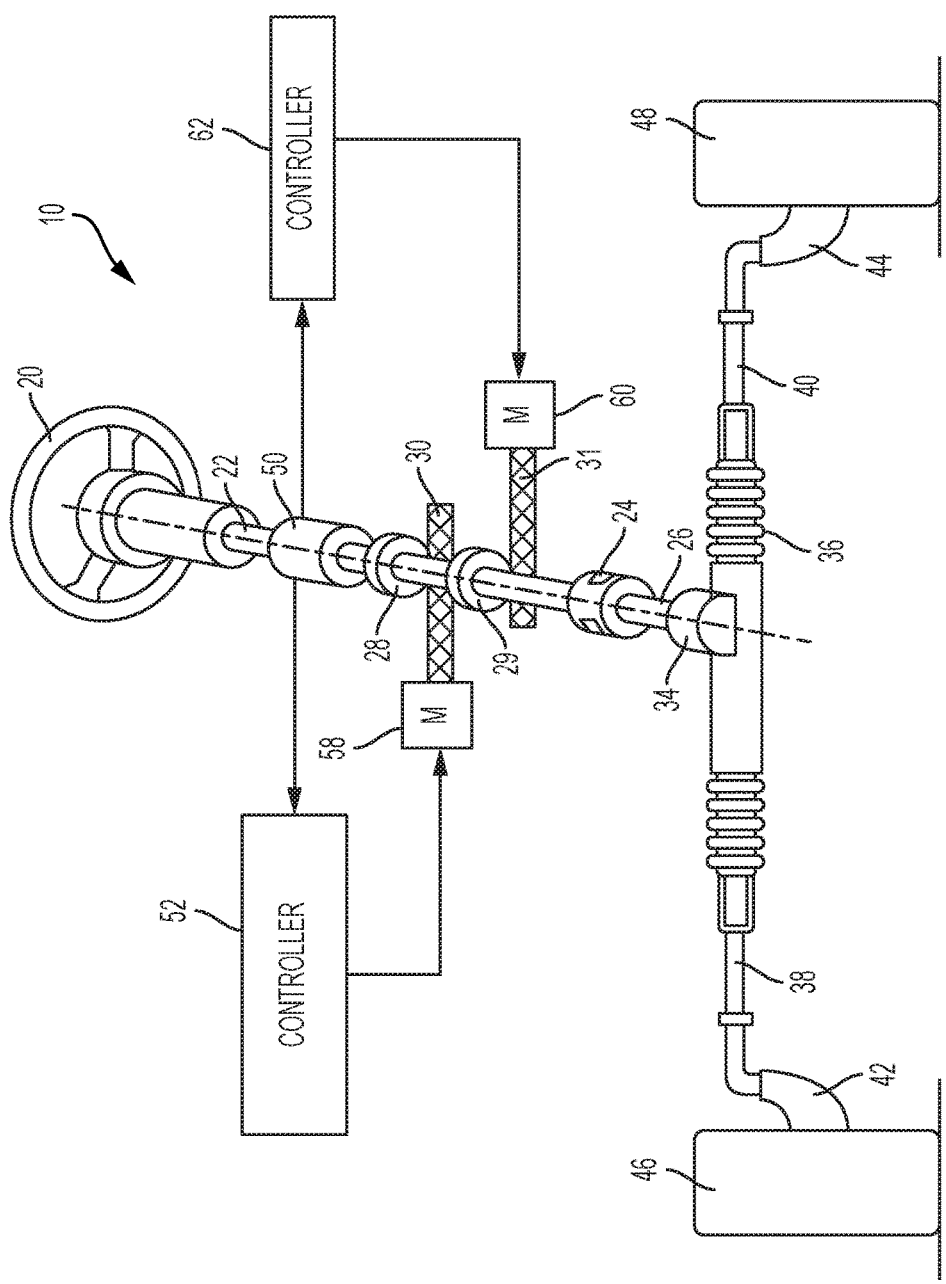
FIG. 6 is a perspective view of a steering system for a vehicle according to another aspect of the invention.

As shown in FIG. 6, another embodiment of the dual gear arrangement is illustrated. In the embodiment of FIG. 6, the gear 28 is a first gear and a second gear 29 is included. In such an embodiment, the first gear 28 includes a single set of gear teeth—such as first set of gear teeth 68 (FIG. described in detail below—and the second gear 29 includes a separate, second set of gear teeth 72. As described herein, a first gear input component 30 is engaged with the first gear 28 (i.e., first set of gear teeth 68) and the second gear input component 31 is engaged with the second gear 29 (i.e., second set of gear teeth 72).

Figure 2:
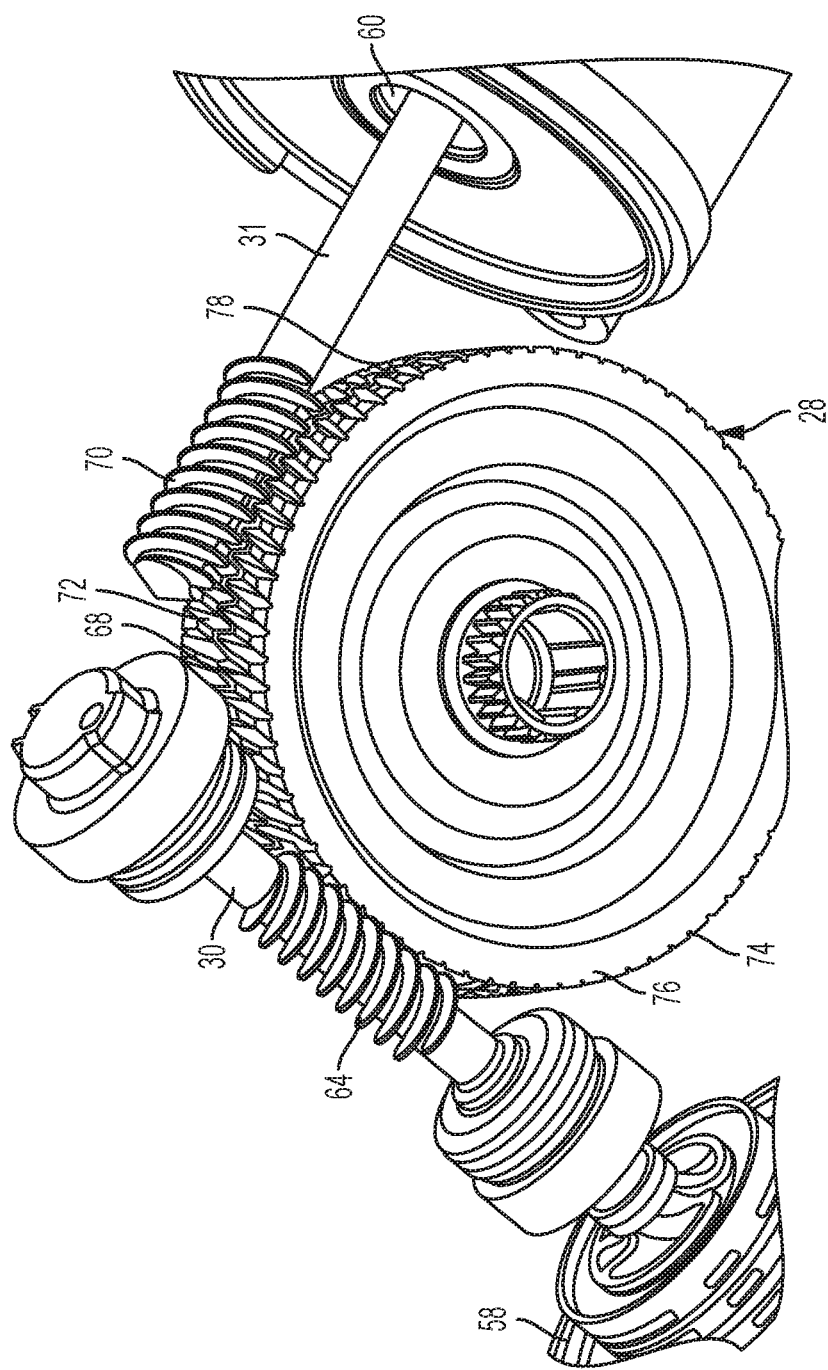
FIG. 2 is a perspective view of a redundant gear assembly for the steering system according to an aspect of the invention.
Figure 3:
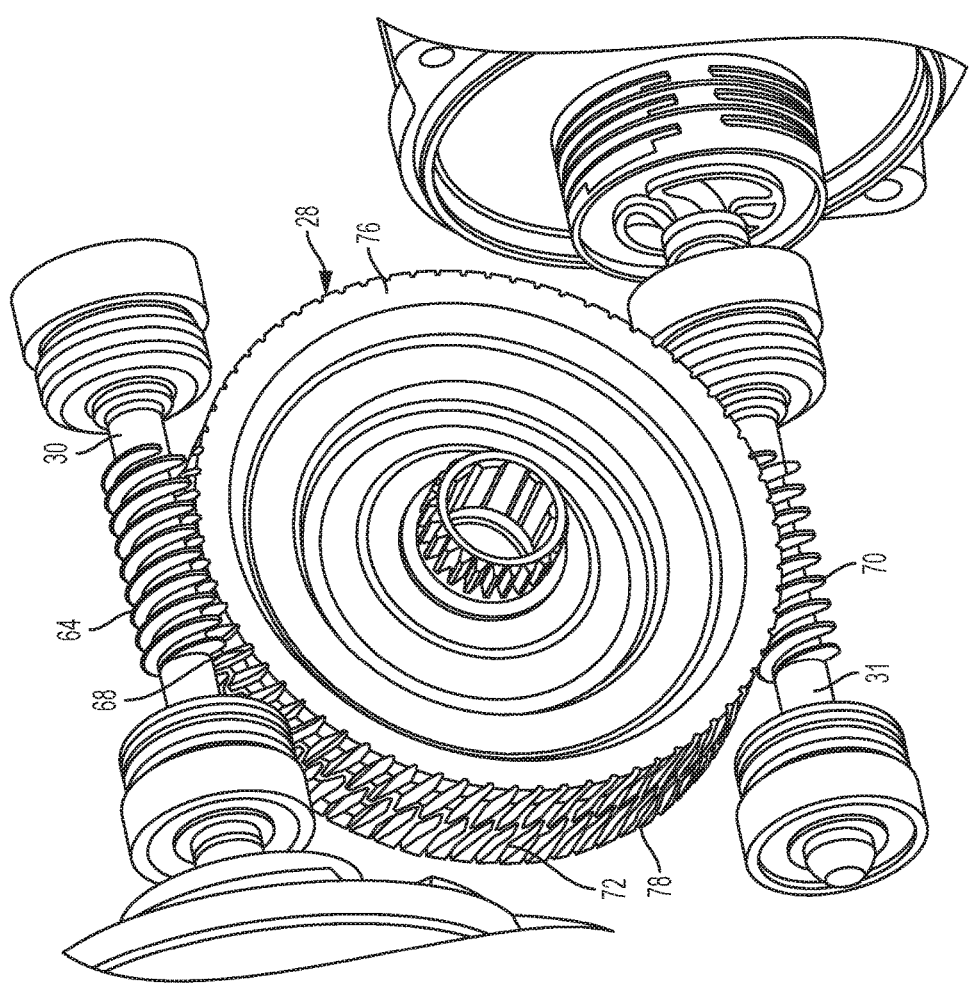
FIG. 3 is a perspective view of the redundant gear assembly according to another aspect of the invention.
Figure 5:
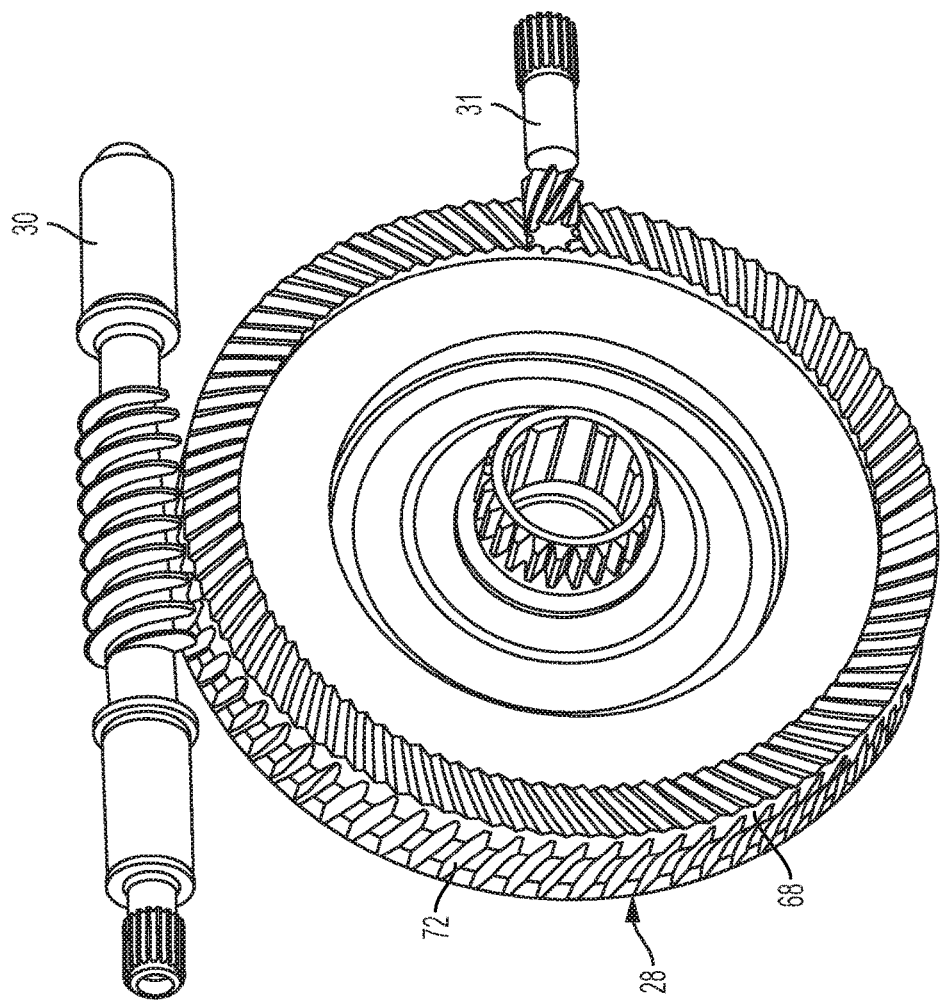
FIG. 5 is a perspective view of the redundant gear assembly according to another aspect of the invention.

Referring to FIGS. 2 and 3, the redundant gear assembly is illustrated in greater detail. FIGS. 2 and 3 depict different orientations of the first and second gear input components 30, 31, but the principles of operations remain consistent with that described herein. Different orientations of the gear input components 30, 31 may provide packaging or other operations benefits depending upon the particular application of use. Regardless of the specific orientations, the gear arrangements in the illustrated embodiment are worm gear arrangements, but it is to be appreciated that one or both of the gear arrangements may be alternative gear connections. For example, one or both of the gear arrangements may be a face gear arrangement (FIG. 5), a spur gear arrangement, a helical gear arrangement, and a spiroid gear arrangement. These are merely illustrative gear arrangements, but it is to be appreciated that several alternative types of gear arrangements may be employed.

In the illustrated embodiment, the first gear input component 30 and the second gear input component 31 are each worms and the gear 28 is a worm gear. As described above, the first gear input component 30 is driven by the first motor 58 and the second gear input component 31 is driven by the second motor 60. It is contemplated that the gear input components 30, 31 are driven by a common motor in some embodiments. Furthermore, a common controller (e.g., controller 52) may control operation of both motors 58, 60 or independent controllers (52, 62) may drive the motors.

Figure 4:
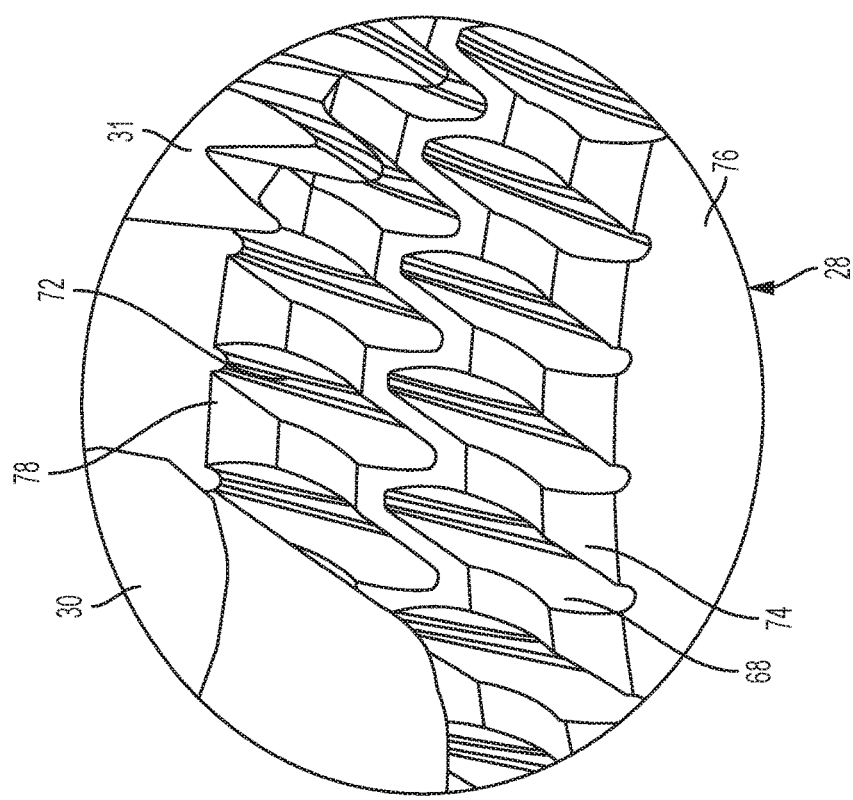
FIG. 4 is a perspective, enlarged view of gear teeth engagement of the assembly of FIG. 2.

The first worm 30 includes a thread pattern 64 that is in meshed engagement with a first set of gear teeth 68 of the gear 28. Similarly, the second worm 31 includes a thread pattern 70 that is in meshed engagement with a second set of gear teeth 72 of the gear 28. Each set of gear teeth 68, 72 extends completely around a circumferential face 74 of the gear 28. The first set of gear teeth 68 is disposed adjacent to a first face 76 of the gear 28 and the second set of gear teeth 72 are disposed adjacent to a second face 78 of the gear 28. The sets of gear teeth 68, 72 extend in an axial direction of the gear 28 and may overlap with each other, as shown well in FIG. 4. Overlapping the sets of gear teeth save packaging space for the overall assembly.

By providing a second set of gear teeth 72 (may also be referred to as a redundant set of gear teeth) on the gear 28, and a second gear input component 31 (may also be referred to as a redundant gear input component) to interact with the second set of gear teeth 72, the gear assembly includes a redundancy that ensures the maintaining of steering capability for a user. This is particularly beneficial in situations where a gear tooth breaks. Various redundancy schemes are disclosed herein.

In some embodiments, the first motor 58 drives the first gear input component 30 to provide a first steering assist torque that is representative of a desired steering assist torque (i.e., 100% or as close as practical to providing all of the desired steering torque) in a primary operating mode. The second motor 60 does not drive the second gear input component 31 during the primary operating mode, but is standing by to provide a second steering assist torque in a redundant operating mode in the event that operation of the first motor 58 or the first gear input component 30 is compromised. In such a situation, the second motor 60 is operational to drive the second gear input component 31 at the second steering assist torque, which may be representative of the desired steering assist torque in some embodiments. If 100% (or approximate thereto) of the desired steering assist torque is provide by the second gear input component 31 in the redundant operating mode, the assembly is considered a fully redundant system, as no falloff is perceptible to the user. However, some embodiments include a second motor 60 that is smaller and provides less assist via the second gear input component 31. A less powerful motor results in less than 100% of the desired steering assist torque to be provided in the redundant operating mode. The lower torque provides a "limp home" mode. A wide range of percentages of the desired steering torque to be provided by the second gear input component 31 is contemplated, including anything less than 100% of the desired steering torque. By way of example, the second steering assist torque provided in the redundant operating mode may be 50% of the desired steering assist torque, but many suitable alternatives are contemplated. In embodiments with the less powerful motor, the second controller 62 may be permitted to provide less functionality.

In some embodiments, the first motor 58 and the second motor 60 drive the first gear input component 30 and the second gear input component 31, respectively, in the primary operating mode. In other words, during normal operation of the gear assembly, torque is transmitted based on a combined input from the first and second gear input components 30, 31. In some embodiments, each motor 58, 60 is capable of providing 100% of the desired steering assist torque and the motors 58, 60 work in conjunction to provide the desired steering assist torque. If each motor 58, 60 is capable of providing 100% of the desired steering assist torque in the primary operating mode, the assembly is considered a fully redundant system, as no falloff is perceptible to the user if one of the gear input components 30 or 31 become inoperable. In other embodiments, the motors are capable of driving the gear input components with a power that generates a combined torque assist that is at least 100% of the desired steering assist torque. The combined torque assist available may be greater than 100%, such as both being capable of providing 75% of the desired steering assist torque, or any other combination of torques that when combined exceeds 100%. Alternatively, to avoid excessive motor power requirements, the combination of torque may be about 100% of the desired steering assist torque. In such embodiments, any combination of the torques is contemplated, such as ratios of 50-50, 60-40, 75-25, etc. These example ratios are merely illustrative and it is to be appreciated that any ratio of torque associated with the first gear input component 30 and the second gear input component 31 may be employed, with either being the dominant number in the ratio.

The embodiments described herein provide either a "limp home" mode or a fully redundant system in the event that a gear arrangement becomes inoperable. Additionally, in embodiments having two motors operating simultaneously allows for gear lash compensation, as the motor could provide a small load against each other to remove lash.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A redundant gear assembly for a steering column comprising:
    a gear operatively coupled to a steering column component;
    a first set of gear teeth on the gear;
    a second set of gear teeth on the gear;
    a first motor driving a first gear input component, the first gear input component in meshed engagement with the first set of gear teeth to provide a first steering assist torque that is representative of a desired steering assist torque in a primary operating mode of the redundant gear assembly; and
    a second motor driving a second gear input component, the second gear input component in meshed engagement with the second set of gear teeth to provide a second steering assist torque in a redundant operating mode of the redundant gear assembly, the second motor not driving the second gear input component in the primary operating mode.

2. The redundant gear assembly of claim 1, wherein the second motor provides less than the desired steering assist torque in the redundant operating mode.

3. The redundant gear assembly of claim 1, wherein the second motor provides a torque representative of the desired steering assist torque in the redundant operating mode.

4. The redundant gear assembly of claim 1, wherein the first gear input component is a first worm forming a first worm gear arrangement with the gear and the second gear input component is a second worm forming a second worm gear arrangement with the gear, the first set of gear teeth disposed on an outer circumferential surface of the gear and adjacent to a first face of the gear, the second set of gear teeth disposed on the outer circumferential surface and adjacent to a second face of gear.

5. The redundant gear assembly of claim 4, wherein the first set of gear teeth and the second set of gear teeth overlap in an axial direction of the gear.

6. The redundant gear assembly of claim 1, wherein the first gear input component and the gear form one of a worm gear arrangement, a face gear arrangement, a spur gear arrangement, a helical gear arrangement, and a spiroid gear arrangement, the second gear input component and the gear forming one of a worm gear arrangement, a face gear arrangement, a spur gear arrangement, a helical gear arrangement, and a spiroid gear arrangement.

7. The redundant gear assembly of claim 1, wherein the vehicle steering column is a steer by wire system.

8. The redundant gear assembly of claim 1, wherein the vehicle steering column is disposed in an autonomous or semi-autonomous vehicle.

9. The redundant gear assembly of claim 8, wherein the first gear input component and the gear form one of a worm gear arrangement, a face gear arrangement, a spur gear arrangement, a helical gear arrangement, and a spiroid gear arrangement, the second gear input component and the gear forming one of a worm gear arrangement, a face gear arrangement, a spur gear arrangement, a helical gear arrangement, and a spiroid gear arrangement.

10. The redundant gear assembly of claim 8, wherein the vehicle steering column is a steer by wire system.

11. The redundant gear assembly of claim 8, wherein the vehicle steering column is disposed in an autonomous or semi-autonomous vehicle.

12. A redundant gear assembly for a steering column comprising:
    a gear operatively coupled to a steering column component;
    a first set of gear teeth on the gear;
    a second set of gear teeth on the gear;

a first motor driving a first gear input component, the first gear input component in meshed engagement with the first set of gear teeth to provide a first steering assist torque in a primary operating mode of the redundant gear assembly; and a second motor driving a second gear input component, the second gear input component in meshed engagement with the second set of gear teeth to provide a second steering assist torque in the primary operating mode.

13. The redundant gear assembly of claim 12, wherein the first steering assist torque and the second steering assist torque provide a combined steering assist torque that is representative of a desired steering assist torque.

14. The redundant gear assembly of claim 13, wherein the first steering assist torque is 50% of the desired steering assist torque and the second steering assist torque is 50% of the desired steering assist torque.

15. The redundant gear assembly of claim 12, wherein the first motor and the second motor are each operable to provide a torque representative of a desired steering assist torque.

16. The redundant gear assembly of claim 12, wherein the first gear input component is a first worm forming a first worm gear arrangement with the gear and the second gear input component is a second worm forming a second worm gear arrangement with the gear, the first set of gear teeth disposed on an outer circumferential surface of the gear and adjacent to a first face of the gear, the second set of gear teeth disposed on the outer circumferential surface and adjacent to a second face of gear.

* * * * *